United States Patent [19]

Stiles

[11] 4,285,749
[45] * Aug. 25, 1981

[54] FABRICATION OF FIBER REINFORCED RESIN STRUCTURES

[75] Inventor: Kenneth M. Stiles, San Dimas, Calif.

[73] Assignee: Sea Log Corporation, Pasadena, Calif.

[*] Notice: The portion of the term of this patent subsequent to Sep. 18, 1996, has been disclaimed.

[21] Appl. No.: 33,800

[22] Filed: Apr. 26, 1979

Related U.S. Application Data

[63] Continuation-in-part of Ser. No. 854,411, Nov. 23, 1977, Pat. No. 4,168,194, which is a continuation-in-part of Ser. No. 824,039, Aug. 12, 1977, abandoned, which is a continuation-in-part of Ser. No. 744,029, Dec. 12, 1976, abandoned.

[51] Int. Cl.$^3$ .................. B32B 17/00; B29C 25/00
[52] U.S. Cl. .................................. 156/180; 156/166; 156/441; 156/499; 264/137; 264/236; 427/372.2

[58] Field of Search ............... 264/236, 137, 229, 263; 156/166, 180, 245, 272, 311, 322, 441, 499; 427/372.2, 374.1; 118/420

[56] References Cited

U.S. PATENT DOCUMENTS

| | | | |
|---|---|---|---|
| 2,871,911 | 2/1959 | Goldsworthy et al. | 264/137 |
| 3,051,992 | 9/1962 | Bradley | 264/347 |
| 3,619,317 | 11/1971 | Shulver | 156/441 |
| 3,717,531 | 2/1973 | Smith | 156/285 |
| 3,946,099 | 3/1976 | Thornley et al. | 264/236 |
| 4,168,194 | 9/1979 | Stiles | 264/137 |

Primary Examiner—James B. Lowe
Attorney, Agent, or Firm—Christie, Parker & Hale

[57] ABSTRACT

A resin reinforced fiber structure is formed by coating and curing the resin of resin coated fibers in air form a hard gel surface is passed through a bath containing a molten metal at a temperature from about 95° C. to the anaerobic degradation temperature of the resin to complete internal cure of the resin under non-oxidizing conditions.

6 Claims, 7 Drawing Figures

FABRICATION OF FIBER REINFORCED RESIN STRUCTURES

CROSS REFERENCE TO RELATED APPLICATIONS

This application is a continuation-in-part of my application Ser. No. 854,411, filed Nov. 23, 1977, now U.S. Pat. No. 4,168,194, issued Sept. 18, 1979, which is a continuation-in-part of application Ser. No. 824,039, filed Aug. 12, 1977, now abandoned, which is a continuation-in-part of application Ser. No. 744,029, filed Dec. 12, 1976, now abandoned.

BACKGROUND OF THE INVENTION

Fiber reinforced structures of a variety of shapes are formed by drawing fibers coated with a thermosetting resin through one or more shaping dies, then curing the resin.

In U.S. Pat. No. 2,684,318 to Meek incorporated herein by reference for instance, glass fibers are fed from a spool through a gathering annulus, drawn through a liquid bath of a thermosetting resin, then gathered into a rod-like bundle, and pressure applied to squeeze out air entrapped between the gathered fibers to compress them into a rod-like bundle of pre-determined cross-sectional shape and size, and passing the bundle under tension through a curing oven. Following cure, the rods are cut into desired lengths.

In U.S. Pat. No. 2,871,911 to Goldsworthy et al, also incorporated herein by reference, pertains to a similar pultrusion process where dielectric heating is utilized to effect a cure.

In U.S. Pat. No. 2,948,649 to Pancherz, and incorporated herein by reference, the fibers in resin are passed through a molding tube where the fiber and resin and plastic material are heated to a point where the resin is on the borderline of passing from a rapidly flowing state into a gel state. The structure is then cooled during the remaining part of its travel through the shaping tube in order to interrupt the course of gelling and hardening of the plastic on the outer layer adjacent the peripheral surface thereof, but to permit the resin to proceed to hardening closer to the central axis of the tube. The structure emerging from the tube is again heated to harden the plastic at the outer layer and finish the hardened plastic surface.

In U.S. Pat. No. 3,977,630 to Bazler, incorporated herein by reference, there is in substance described another general method for forming structures of duct-like shape.

Yet another method of preparing fiber reinforced structures is described in U.S. Pat. No. 3,718,449 to Fahey, incorporated herein by reference.

In my co-pending application, Ser. No. 854,411, incorporated herein by reference, as are the applications of which this is a continuation-in-part, there is described a pultrusion method where continuous fibers, coated with the heat curable thermosetting resin composition below the temperature at which cure is initiated, are passed through a plurality of in-series elongated open heating zones, each having at least one internal heating surface spaced from each other, in between which are imposed at least one cold shaping die which is relatively narrow with respect to length of the heating zone, and having a structural shaping orifice. The internal surfaces of the heating zone are in spaced relation to the resin coated fibers such that the resin is heated by radiation and convection to a temperature sufficient to reduce viscosity of the resin relative to the introduction viscosity of the resin to the heating zone and initiate partial cure of the resin. The heated resin is then drawn through the orifice of the cold shaping dies between each heating zone at a die temperature maintained substantially below the temperature at which the curing of the resin is initiated. Following the last of the cold shaping dies, the structure at the gel point is passed through a final heat zone, termed a "curing zone", to promote the exothermic curing reaction in the hope of achieving complete resin cure.

I have found that in the practice of such a pultrusion process or other structure forming process that passage through an open final curing zone is incapable of achieving under practical operating conditions complete cure, i.e., substantially complete cross-linking and/or polymerization of the resin. This has been found to be true, even though the surface appears hard. Cure can, therefore, continue when the structure is in storage, whether cut to length or stored on a reel. In the former case, the structure can change shape, as by sagging. In the latter case, the structure can change shape or take a "set" conforming to the diameter of the take-up reel. In either case, this can induce a "memory" which is undesirable in subsequent handling of the finished structure.

The avoidance of this situation is exemplified by the highly refined structure described in my U.S. Pat. No. 4,113,349, incorporated herein by reference. The ability to relieve stresses on the optical fiber during manufacture can be offset if the structure takes, during extension of cure, the shape of the take-up reel in which instance the final structure is difficult to uncoil and lay flat.

Curing of resin coated fibers in an open heated curing zone exposed to air may increase the rate of cure but to the detriment of the resin, degrading at least the surface and materially darkening the surface.

A need, therefore, exists for a modification of the above-identified processes to insure that cure is complete, or essentially complete, before the structure is cut to length or taken up on a storage reel or the like.

SUMMARY OF THE INVENTION

The process of the present invention is directed to an improvement in a process for the fabrication of fiber reinforced resin structures wherein the resin is a thermosetting resin and which insures complete cure of the resin during fabrication.

In a process, therefore, for the production of fiber reinforced resin structures wherein a plurality of continuous fibers are coated with a fluid heat curable thermosetting resin at a temperature below the temperature at which cure of the thermosetting resin is initiated, shaped to the desired structural shape and the resin cured by application of heat to the degree of at least providing an exposed hard gelled surface, the improvement of the present invention resides in passing the shaped fiber reinforced resin structure having the hard gelled surface through at least one molten metal bath maintained at a temperature from about 95° C. to the anaerobic degradation temperature of the resin for a time sufficient to achieve essentially complete cure of the resin. It is preferable that the molten metal bath be between about 140° C. and 230° C. and composed of at least two of the metals selected from the group consisting of tin, lead, antimony, bismuth, indium and cadmium.

More particularly as preferably applied to a pultrusion process, the steps preceding contact with the molten metal bath may comprise coating, under tension, a plurality of continuous fibers in spaced relation to each other with a molten, heat curable thermosetting resin composition, the resin being sufficiently liquid to at least partially coat the fibers but maintained at a temperature below that at which cure of the resin will be initiated, then passed through a preheating zone. Preferably, the coated fibers are combined in contiguous relation and passed through an excess resin removal zone, then spread apart and passed through a preheating zone in spaced relation. Whether or not in spaced relation, the fibers are heated by at least one radiant heating surface spaced from the fibers to achieve a reduction of resin viscosity then combined, if not already combined, and passed through a first shaping die. Any fiber or fibers to be clad by the resin coated fibers is added ahead of or at the first shaping die.

The precoated combined fibers are then passed through a plurality of elongated radiant heating zones in series, each providing at least one heated surface, the surfaces of the heating zones being spaced from the resin impregnated fibers, the radiant heating zones of the series being separated from each other by at least one cold shaping die, each die being narrow relative to the length of the radiant heating zones. In each radiant heating zone, the resin is heated, by radiation and convection, to a temperature sufficient to induce some polymerization and still reduce the viscosity of the resin, preferably to below its initially applied viscosity. This makes the resin more mobile to increase wetting of the fiber surfaces as an aid in shaping to the final structure. Resin temperature achieved in each heating zone is sufficient to induce partial cure of the resin which induces a viscosity increase sufficient to prevent the resin from draining from the fiber surfaces.

As indicated, between each radiant heating zone, the fiber and coating resin are drawn through one or more relatively narrow cold shaping dies. The shaping dies are maintained at a temperature substantially below the temperature at which curing of the resin is initiated. In passing through the orifice of each die, the resin and fibers are progressively formed into the desired cross-sectional configuration with attendant expulsion of excess resin. This maximizes radial compression of the fibers in respect to each other. The dies should be maintained at a temperature sufficiently low such that cure of the expelled resin within the die or on the die surface will not be promoted. This permits expelled resin to flow over the die surface. If the resin which is expelled tends to collect on the surface of the die, it can be removed by raising die temperature and/or by an air blast, or the like.

Gel point, the point at which viscosity can no longer be reduced by application of heat and where cure will be accelerated with a large release of heat per unit mass, is delayed until at or just before the last die. At this point, the resin is in a firm gel state where the structure retains its configuration but remains workable to a degree to enable any excess resin to flow and be removed from the surface by a final shaping die.

From the final die, the shaped structure is passed through another curing zone where through heating by radiation and convection, the resin surface achieves a hard gel state that is cured to the degree of solidification where shape will apparently no longer change. After passing through the curing zone, essentially complete surface and internal cure is achieved in at least one molten metal bath.

The molten metal bath provides an oxygen-free, relatively constant temperature sink which promotes the rate of cure and serves, as necessary, to absorb the exothermic heat of the continuing curing reaction without a significant change in temperature. As opposed to the prior zones where heat is applied through a gas mantle surrounding the structure, the structure is in direct contact with the molten metal where heat is applied by conduction offering up to a hundred-fold increase in driving potential for sustaining the structure at an elevated temperature to achieve complete cure.

In the practice of shaping the article, each die is to be maintained at as low a temperature as conveniently possible to act as a shaping die while tending to retard cure during the shaping process, but may be partially heated by provided heating means or allowed to be heated simply to whatever temperature is induced in the passage of heated parallel fiber-resin matrix therethrough and heat of radiation and/or convection from the adjacent heating zones. It is essential that the die surface be maintained at a temperature sufficiently high such that the resin which exudes from the fiber-resin matrix passing through the die onto the surface of the die will flow from and be removed from the surface before thickening or cure occurs. This prevents the formation of cured resin at the die orifice which would otherwise increase friction, disfigure the surface of the article being shaped and, perhaps, induce rupture of the fibers passing through the die.

Rate of passage through the dies and heating zones is normally controlled by the number of heating zones and dies in series, the minimum number of heating zones and dies respectively employed being preferably two. As the number of heating zones and dies are increased, the rate of feed through the system can be increased materially with the proviso that attainment of the gel point is precluded until contact with or just prior to contact with the final die. In general, the point relative to the final die at which the resin reaches the gel point becomes less critical as the number of dies increase.

DETAILED DESCRIPTION

Figure 1:
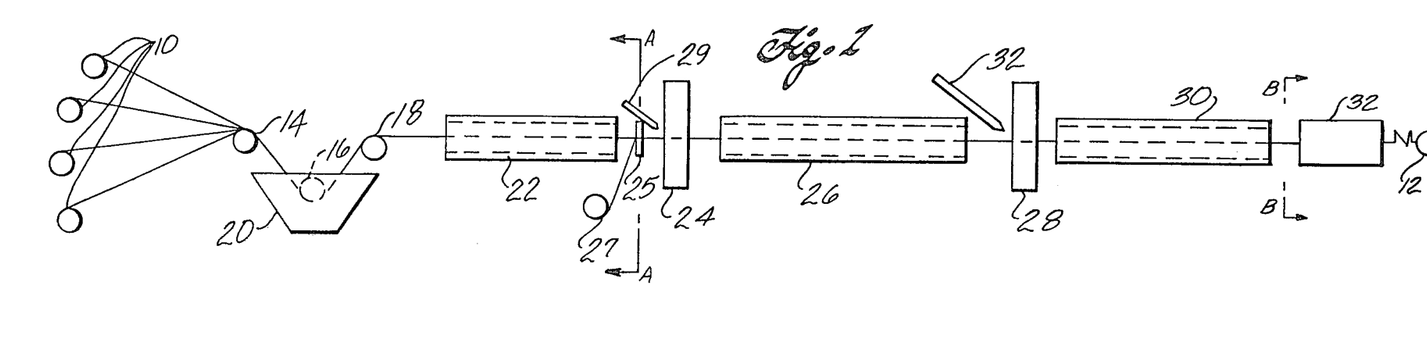
FIG. 1, is a schematic illustration of apparatus used and the steps which occur in practice of the process of this invention.
Figure 3:
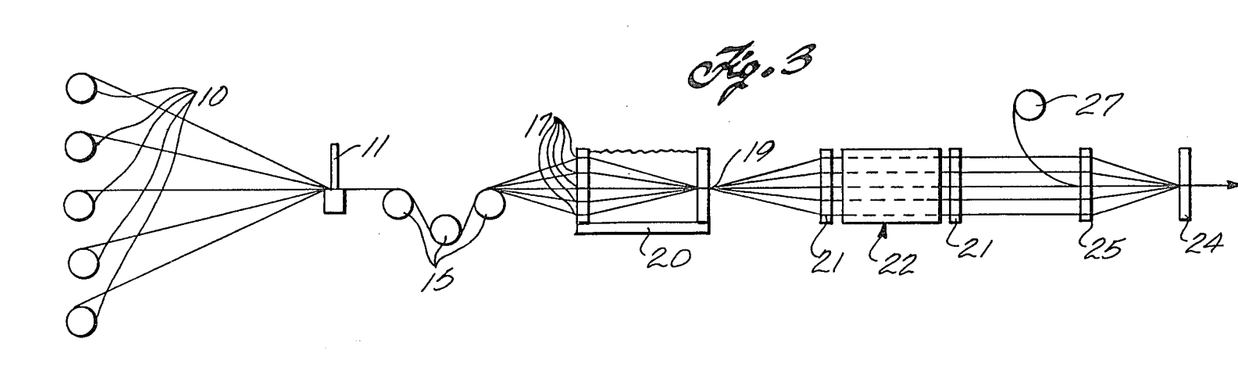
FIG. 3, illustrates the presently preferred steps taken before reference point "A—A" of processing the fibers to the first shaping die.

With reference to FIGS. 1 and 3, the fibers to be formed into a fiber reinforced resin structure or for embracing another fiber in strengthening or protective (ruggedizing) relationship are provided by plurality of creels or spools 10 and are drawn under tension provided by take-up reel 12 and passed, if desired, through comb 11 to provide fiber spacing and the like. They may, as shown in FIG. 1, be passed over roller 14 and under 16 of resin bath 20 to achieve an initial resin coat. In this instance, the coated fibers may be passed over roller 18, which acts as a squeegee to remove excess resin. Other means of removing excess resin may also be used. The presently preferred route with reference to "A—A" is detailed in FIG. 3.

With reference to FIG. 3, the fibers from comb 11 are passed over tensioning rolls 15 and spread in a fan-like array by orifices 17 in the inlet end wall of resin bath 20. The orifices are fitted with seals to prevent resin leakage. The fibers are coated with resin in spaced relation to one another and combined at sizing orifice 19, also provided with a seal to prevent leakage, then spread apart by spacing dies 21 and maintained in spaced relation through preheating chamber 22. Orifice 19, in addition to bringing the fibers into contiguous contact, acts as a means to remove excess resin serving for this purpose the equivalent of squeegee roll 18 of FIG. 1.

The resin supplied is a heat curable thermosetting resin composition maintained in a liquid state at ambient or elevated temperatures.

The nature of the thermosetting resin may be varied widely and include, among others, epoxy resins, such as epoxidized cyclopentadiene; polyimides; polyesters, phenolformaldehyde resins; ureaformaldehyde resins; diallyl phthalate resins; silicone resins; phenol-furfural resins; urethane resins and the like, depending upon the desired composition of the finished product. Included in the melt, if required, is a high temperature initiator or hardener which is latent in respect to initiation of cure while in the molten bath but at some elevated temperature, will initiate and propagate cure of the resin to a thermoset end product. Typical of such hardeners are aromatic amines. Hardeners may be omitted if the resin will cure by application of heat alone. Included as desired are accelerators, diluent resins, fillers, colorents, flame retardant, and the like. The temperature of bath 20 is not narrowly critical so long as it is maintained at a temperature below the temperature at which cure of the resin will be initiated. This is known as the resin "A" stage. Generally, a typical bath temperature will range from about 20° C. to about 30° C. Agitation and pressure-vacuum recycling of the bath may be used to occlude the presence of air bubbles or the like as is required.

Figure 2:
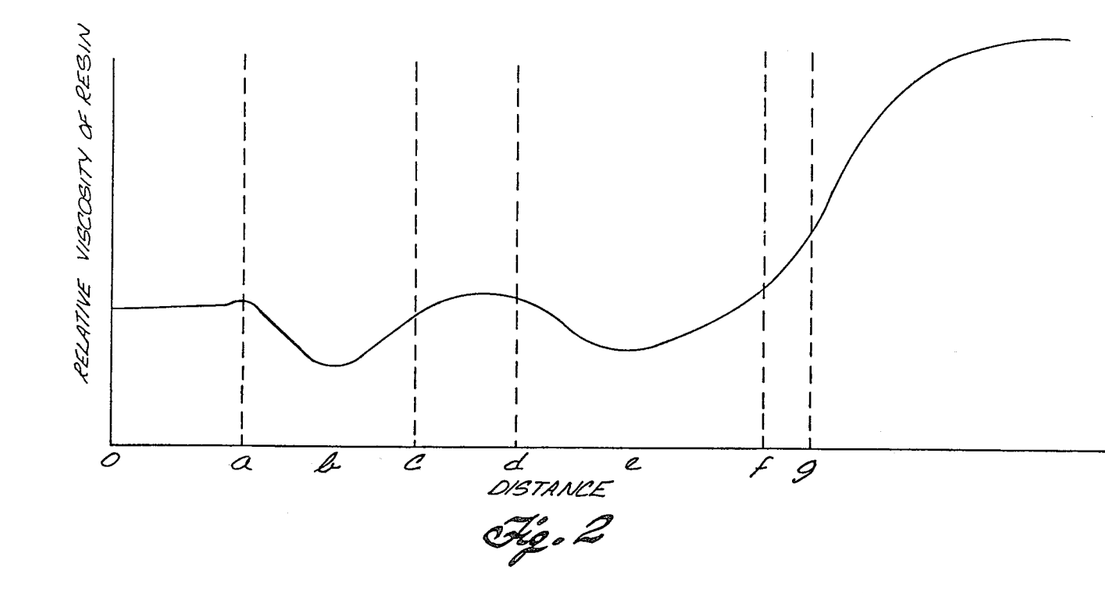
FIG. 2, illustrates the relative viscosity of the applied resin at each stage along the process.

As fibers are drawn through the bath and over roller 18 or through orifice 19, they are precoated with the thermosetting resin melt and carried to and passed under tension through a first radiant heating chamber 22 in spaced relation to each other. Orifice 19 serves in a preferred embodiment to combine the fibers just ahead of chamber 22 while the first spacing die 21 spreads them apart for passage through preheat chamber 20. This has been found to provide a more uniform coating on the fibers and in the end, results in a product of more uniform axial strength with a minimum of resin necessary to achieve the desired strength. With reference now to FIG. 2, in radiant heating chamber 22, which serves as a preheat chamber, the resin is heated from radiant energy received from a heated surface(s) always in spaced relation to the surface of the resin coated fibers which are spaced from each other and by convection to initiate polymerization and break resin viscosity. This induces an initial reduction in viscosity (a-b) such that the resin will become more fluid and more thoroughly and uniformly wet the fibers. Cure initiates with an attendant increase in viscosity (b-c) to return to about the initial viscosity. This is to prevent the resin from draining from the fiber surfaces before or at shaping die 24.

Typical internal preheat zone temperatures are from about 85° C. to about 130° C., depending on the initiation temperature required by the accelerator to start cure. The cure initiates and begins the "B" stage at about the minimum point (b) of the viscosity curve illustrated in FIG. 2. With initiation of cure, viscosity increases as some of the cross-linking reactions occur.

The resin and fibers are then brought into contact with an passes through the orifice a first cold shaping die 24 where an initial shape is provided to the fiber reinforced resin matrix with exclusion of a portion of the resin. The resin is forced from the matrix as it passes through the die and normally runs over the die surface. To facilitate its expulsion from the die orifice, a blast of a fluid, such as air, may be induced from jet 29. This prevents the resin from curing or congealing on the surface of the die.

Ahead of the first cold shaping die, there may be positioned one or more grids 25 used to position the fibers in proper spacial relation to one another for entry to die 24 and for adding, if desired, a fiber from reel 27 to be surrounded by the other fibers. The fibers passing through the preheating zone are as shown in FIG. 3 in a spaced parallel or converging fan-like configuration and formed into a circular pattern by grid 25 with a central opening for introduction of a fiber from reel 27 for passage, in combination, through a circular shaped die orifice. Little, if any, resin is lost in passing the resin coated fibers through grid 25.

By "cold shaping" or "relatively cold shaping" die 24, there is meant a die which is relatively narrow in respect to the length of the radiant heating zones and maintained at a temperature below the temperature of adjacent heating zones and below the temperature at which cure of the resin will be promoted and which serves to suppress the curing process to the extent the expelled resin will flow over the die surface and away from the die orifices. To this end, the die may be allowed to achieve whatever surface temperature results as an incidence to the passage of the heated fibers and resin through the die, and from radiation and convection from adjacent radiant heating zones to promote flow of expelled resin over its surface. It may, if desired, be internally heated to promote flow of the expelled resin over its surface as required to prevent resin from congealing on the die, particularly at the die orifice. Effective die temperatures up to about 70° C. have been employed.

After passing through cold shaping die 24 where the resin may have reached a relatively constant viscosity and with reference again to FIG. 2, the composition is passed through a second radiant heating zone 26 having a heated surface spaced from the resin and fiber where through an increase in temperature induced by radiation and convection, the viscosity of the resin is again reduced (d-e) and cure promoted (e-f). After passing through the minimum (e) as shown in FIG. 2, viscosity increases.

The sequence is repeated as often as desired and, in practice, as many as five or more dies in series have been used until a final cold die 28 treated in the same manner as die 24 is reached.

The process is controlled such that the structure reaches the gel point (g) at or just prior to final shaping die 28.

The "gel point" is where the resin is in a glassy solid state, still sufficiently soft to mold and remove excess resin to thereby enable the formation of the final shape to the article, but is otherwise beyond the point where a viscosity reduction and heating will occur. It is also the point where cure will be irreversibly accelerated. Such as is shown in FIG. 2, viscosity will on a relative basis rapidly increase with time with a high exotherm per unit mass.

Following passage through final cold shaping die 28 the structure is passed through curing zone 30 where, through application of heat of radiation and convection the surface becomes hard gelled. By a "hard gelled surface" as used herein there is meant a surface sufficiently solidified that it will no longer change shape and will not soften when heated to an elevated temperature.

Following passage through the curing zone 30, the shaped product now having a hard gelled surface is passed through molten metal bath 32 where the shaped article is brought into intimate contact with a molten metal composed of metals forming a melt that is maintained at a temperature from about 95° C. to the anaerobic decomposition temperature of the resin. Temperatures ranging from about 130° C. to about 230° C. are presently preferred.

The molten metal bath provides a compliant high density heat transfer medium which increases rate of cure of the resin at and internal of its exposed surfaces and serves because of its heat capacity to absorb the exotherm of the curing reaction without an appreciable change in temperature. In sum, cure is in an essentially isothermal medium which heats the resin by conduction and provides a rapid and essentially complete cure. In addition, higher temperatures can be employed than in curing zone 30 without degradation of the resin because the metal bath tends to substantially exclude the presence of oxygen during heating of the resin to achieve complete cure.

Representative of the metals which may be used are low melting alloys containing at least two of the metals selected from the group consisting of bismuth (Bi); lead (Pb); tin (Sn); Indium (In) cadmium (Cd) and antimony (Sn). A variety are available from Cerro Copper and Brass Corp. with illustrative alloys being "Cerralow 117", an alloy of 44.7% by weight Bi, 22.6% by weight Pb, 19.1% by weight In, 8.3% by weight Sn and 5.3% by weight Cd having a melting point of about 48° C.; "Cerralow 136" an alloy of 49% by weight Bi, 21% by weight In, 18% by weight Pb and 12% by weight Sn; "Cerrobend" an alloy of 50% by weight Bi, 26.7% by weight Pb, 13.3% by weight Sn and 10% by weight Cd having a melting point of about 70° C.; "Cerrobase" an alloy of 55.5% by weight Bi and 44.5% by weight Pb having a melting point of about 124° C.; "Cerrotru" an alloy of 58% by weight Bi and 42% by weight Sn having a melting point of about 138° C.; "Cerrotru 147" an alloy of 48% by weight Bi, 25.6% by weight Pb, 12.8% by weight Sn, 9.6% by weight Cd and 4.0% by weight In, having a melting point of from about 61° C. to about 65° C.; "Cerrosafe" an alloy of 42.5% by weight Bi, 37.7% by weight Pb; 11.3% by weight Sn; and 8.5% by weight Cd having a melting point of from about 70° C. to about 88° C.; "Cerromatrix" an alloy composed of 48% by weight Bi, 28.5% by weight Pb, 14.5% by weight Sn and 9% by weight Sb having a melting point of from about 103° C. to about 227° C. and "Cerrocast" an alloy of 60% by weight Sn and 40% by weight Bi having a melting point between about 130° C. and 170° C.

Figure 4:
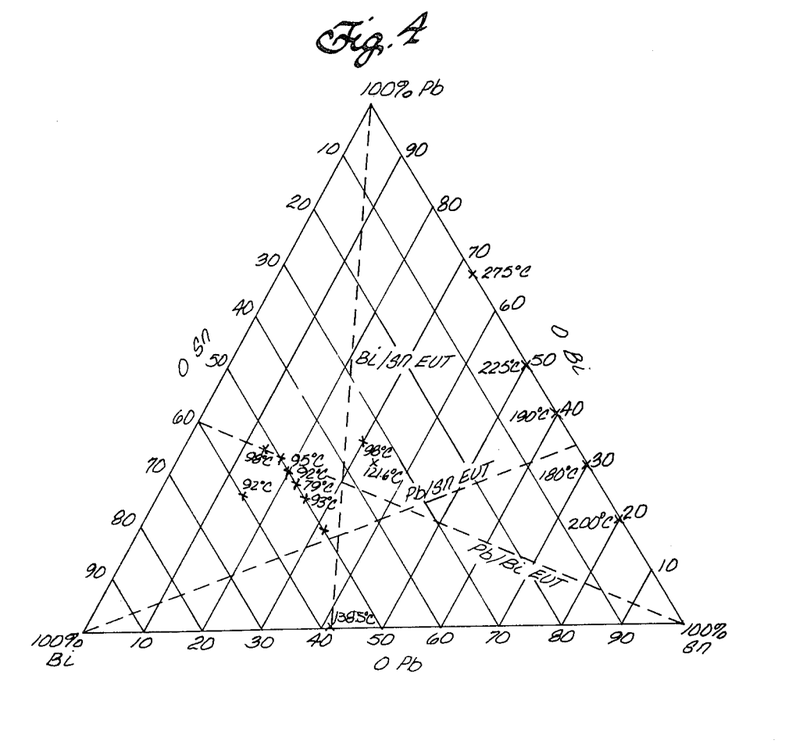
FIG. 4, is a ternary diagram illustrating the melting points of various combinations of lead, bismuth and tin.

Melting points of compositions based on tin, bismuth and lead are shown in attached FIG. 4, which is a ternary diagram. The melting points of some useful compositions are shown.

"Woods metal" composed of about 50% by weight Bi, about 25% by weight Pb, about 12.5% by weight Sn and about 12.5% by weight Cd may also be used alone or in admixture with other alloys.

Figure 5:
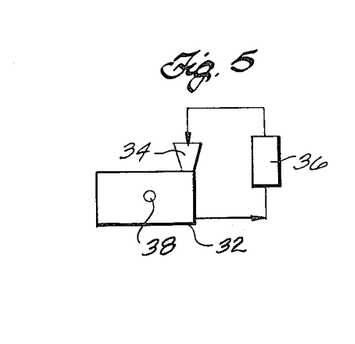
FIG. 5, illustrates a frontal view taken at "B—B" of the trough for the molten metal bath.

FIG. 5 illustrates an end view of a useful trough taken in part at "B—B" which is useful in the practice of the invention. With reference thereto, trough 32 has a fluid head of molten metal in reservoir 34. The melt is kept at a desired operating temperature using external heat exchanger 36 which may be used to add heat to account for heat losses, or, as the case may be, to remove the exothermic heat of the continuing curing reaction. Alternately, heaters and coolers may be attached to the walls of trough 32. Gate 38 is shaped to conform to the cross section of the structure undergoing cure and may be made of an elastomer, preferably an elastomeric cured silicon rubber, which will withstand the operating temperature to maintain a seal and exclude to the maximum extent the "drag-in" of air. Another gate may be at the opposed end of the trough and used to prevent "drag-out" of the metals of the bath. If desired, the structure may be drawn through the molten metal bath at an angle to the horizontal such that the cured articles leave the bath a horizontal surface to avoid the use of two vertical gates. For elevated temperature operation, cooling air jets (not shown) may be used to keep the gates closed.

Two or more baths operating at the same or different temperatures may be employed. The use of a molten metal bath enables the resin to cure a higher temperatures and in shorter times and, consequently at shorter travel distances.

Substantial exclusion of oxygen is important to prevent degradation of the resin. Degradation, at least to the extent of undesired discoloration of the resin, is frequently encountered at the temperatures employed but avoided by the use of the molten metal which surrounds and protects the resin surface.

To avoid the formation of dross or metal oxides in the bath, the trough may be sealed or maintained under an inert atmosphere. Although some oxygen may be dragged in, the amount available for formation of metal oxides which may etch the resin surface or attach to the resin surface is minimized.

As indicated above, the structure undergoes essentially complete cure. The time required to achieve essentially complete cure will depend on structure geometry resin loading and the temperature of the molten metal bath.

The achievement of essentially complete cure may be determined subjectively and quantatively. A subjective test is to bend the structure until a break occurs. If a break initiates on the tension side and progresses through the structure, cure is "essentially complete". Incomplete cure, however hard the structure may appear, is manifested by bursting and delamination of the structure. Completeness of cure can be determined quantatively by devices which measure dielectric constant. Illustrative of such devices are a Marconi "Q" Meter, which measures the relation of reactants to resistance at high frequencies and permits a determination of dielectric constant. An Audrey II Series 80 instrument manufactured and sold by Tetrahedron Associates Inc. of San Diego, Calif. may also be used. When dielectric constant approaches or reaches a maximum, cure is essentially complete.

Figures 6, 7:
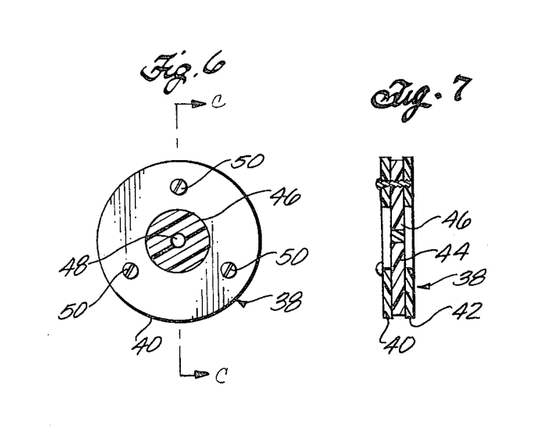
FIG. 6, shows an end view of a gate for the trough of FIG. 5.
FIG. 7, shows a side view taken at "C—C" of the gate of FIG. 6.

FIGS. 6 and 7 taken at "C—C" illustrate the preferred gate for the trough. With reference thereto, gate 38 consists of plates 40 and 42 containing therebetween an elastomeric seal 44 preferably made of an RTV silicon rubber. The plates provide an opening 46 greater than the opening 48 in seal 44 which conforms to or is undersize with respect to structure and may be formed by molding the seal about the structure. Screws 50 are used to draw the plates together to initially hold seal 44 in place; and with use, tightening of the screws will tend to close opening 48 to account for seal wear.

When completely cured or essentially completedly cured, the structure may be cut into sections or taken up by reel 12.

In the practice of the process, the heating zones following the first cold shaping die are typically maintained at a higher temperature than the first preheating zone and in the instance of high temperature cured epoxy resins, in a range of about 170° C. to about 220° C., or at least at a temperature sufficient for the resin to break its viscosity to enhance wetting of fibers and filling interstices between the fibers. The curing zone 30 is maintained at the same, lower or higher temperature as one of the preceding zones. As indicated, the molten metal bath is maintained at an operating temperature from about 95° C. to the anaerobic decomposition temperature of the resin, preferably from about 130° C. to about 230° C.

Typically, resin content at the exit of the first die of the series is normally at a level from about 20% to about 40% resin, based on the weight of resin and fibers, and will be reduced by about 20% to about 25% by weight of the original resin content by the time the final die is reached. The precise amounts will vary depending on the desired degree of compaction between fibers.

The heating zones may be of any desired cross-sectional shape and of a shape independent of the cross section of the article to be produced. Heating may be by resistance coils, heating tapes, fluid flow and the like with suitable thermostatic control. Heating of the resin and fibers is by radiation and convection. Conduction is not employed since there is no contact between the resin and fibers with the internal surfaces of the radiant heating and curing zones.

Each of the radiant heating and curing zones used in the practice of the process of this invention, as for the molten metal bath, are in spaced relation to the resin and fibers which pass through them. Their function, except for the curing zone, is to cause viscosity reduction of the resin while polymerization is stepwise progressed to the gel point, but play no part in shaping the final structure. This function is reserved to the relatively narrow cold shaping dies. While the radiant heating zones may range from 2 feet or less to 8 feet or more in length, the shaping dies will have a thickness of from about 1/64 to ¼ inch, depending on the rigidity necessary to accommodate the load imposed by the passage of resin and fibers through the orifices of the dies. Orifice openings may be for structures of circular configuration from 0.01 inch or less to 0.5 inch or more. The die orifices are normally provided with rounded inlet edge surfaces to reduce friction and promote removal of exuded resin.

As a consequence of employing narrow shaping dies which cooperate with adjacent radiant heating zones which play no shaping function, the energy required to achieve a finished product as compared to the techniques taught, for instance, in U.S. Pat. No. 2,948,649, is materially reduced. In addition, the continuous removal of the exuded resin over the surface of the die either by flow alone and/or with an air blast, there is avoided buildup of resin at the orifice. This avoids surface disfigurement which can readily occur in an elongated heating or cooling shaping section as described in such patent. Surface irregularities within elongated shape controlling sections, for instance, can entrain resin which becomes stagnant and tends to cure leaving rough spot(s) to increase friction and cause disfigurement of the article to be shaped.

The process of this invention may be used with any of the known fibrous materials including metallic, semi-metallic, natural organic, synthetic fibers, glass fibers, and combinations thereof. Illustrative fibers are glass fibers, steel fibers, Aramid TM fibers, graphite fibers, and the like. Included within the fibers may be fibers which are to be surrounded by other protective coatings including soft metal fibers, such as copper, optical fibers, and the like.

The process of this invention is applicable to forming configurations of any desired cross section. They may be formed as relatively thin planar structures containing electrical conductors, optical fibers, fluid conductors, and the like, contained within a surrounding fiber reinforced resin structure, the shape of which is determined by the cold shaping dies. Multiple coating of individual fibers may also be employed with precoating of fibers accomplished in tandem operations or two or more coating units operated as desired to meet the ends of the end product required. For instance, in the situation where a central fiber is surrounded by strengthening fibers, the central fiber may be coated with a release material to which the resin will not adhere or bond to provide a fiber which, in substance, is surrounded by a fiber reinforced cured resin casing which can be stripped from the central fiber without breaking adhesive bonds between the resin and the central fiber.

By the practice of the instant invention, more precise control over the shape and quality of the end product is achieved at a material reduction in power consumption. In addition, fibers can be drawn through the shaping apparatus without breaking and can be compacted to the maximum extent possible.

While nowise limiting, the following examples illustrate the practice of the process of this invention.

EXAMPLE 1

There was maintained, at a temperature of 21° C. to 24° C., a molten bath of a heat curable epoxy resin formulation comprised of 100 parts by weight Epoxy Resin 826, 32 parts by weight of Tonox Hardener manufactured and sold by Naugasett Chemical Company, and 4 parts by weight of D.M.P. No. 30 Accelerator manufactured and sold by Rohm and Haas Chemical Company. To reinforce (ruggedize) a buffered, graded index, optical fiber to Type SCVD supplied by International Telephone and Telegraph Company, 28 ends of (Owens Corning S-901, high glass filaments) were drawn through the resin bath in spaced relation at a speed of 12 to 14 feet per minute, and on leaving the resin bath, were combined and passed through an aperture to remove excess resin. The fibers were then separated by a spacing die having apertures with a spacing of one-quarter inch between adjacent strands, and in this open configuration the parallel strands were carried through an 8-foot long preheating zone in spaced relation to the internal surfaces of the preheating zone maintained at 172° C.

At the outer end of the preheating zone, the optical fiber was introduced into the center of the group of reinforcing resin coated glass fibers, and the combined fibers were drawn together and through five successive sizing dies and heating chambers the last of which serving as a curing chamber with the combined fibers in spaced relation to the surfaces of the chambers. Each of the heating chambers was 32 inches in length and was maintained at a temperature of 182° C. Following the curing chamber, the fiber at a diameter of 40 mils was drawn at the rate of 12 to 14 feet per minute through an 8 feet long one inch wide and one inch deep molten metal bath formed by mixing about equal parts of Woods metal and Linotype metal, each manufactured by Cerro Copper and Brass Co. The bath was maintained at a temperature of 180° C. Cure of the resin was determined to be essentially complete. At the end of this process, the cured and finished, ruggedized optical fiber was wound on a 4-foot diameter reel driven by a speed controlled pull-through drive motor.

EXAMPLE 2

The procedure of Example 1 was repeated except that cable diameter was 70 mils. Throughput was reduced to 11 feet per minute and the molten metal bath increased in temperature to 232° C. to achieve essentially complete cure before takeup of the reel.

What is claimed is:

1. A process for the production of fiber reinforced resin structures which comprises, under tension:
   (a) coating a plurality of continuous fibers with a liquid heat curable thermosetting resin composition at a resin temperature below the temperature at which cure of the thermosetting resin is initiated;
   (b) passing the resin coated fibers through a plurality of in series elongated radiant heating zones, each having at least one heated internal surface, each heating zone being spaced from each other and from at least one interposed cold shaping die which is relatively narrow with respect to the length of a radiant heat zone and having a structure shaping orifice, the internal surfaces of the heating zone being in spaced relation to the resin coated fibers, said radiant heating zones raising the applied resin by radiation and convection to a temperature sufficient to reduce the viscosity of the resin relative to the introduction viscosity of the resin to the radiant heating zone and initiate partial cure of the resin;
   (c) drawing the fibers and resin through the orifices of each cold shaping die between each radiant heating zone at a die temperature between each radiant heating zone at a die temperature substantially below the temperature at which curing of the resin is initiated;
   (d) drawing the resin coated fibers through at least one cold shaping die following the last of said radiant heating zones, said die being at a temperature substantially below the temperature at which cure of the resin is initiated, the resin being at the gel point at or prior to contact with the final die;
   (e) passing the resin coated fibers from the final cold shaping die through at least one curing zone providing internal heating surfaces in spaced relation from the resin coated fibers for a time sufficient for the resin to achieve a hard gelled surface;
   (f) passing, in the substantial absense of oxygen, the resin coated fibers having the hard gelled surface through at least one molten metal bath maintained at a temperature from about 95° C. to the anaerobic degradation temperature of the resin for a time sufficient to achieve essentially complete cure of the resin of fiber reinforced resin structure.

2. A process as claimed in claim 1 in which the molten metal bath is maintained at a temperature from about 130° C. to 230° C.

3. A process as claimed in claim 1 in which the molten metal bath comprises at least two metals selected from the group consisting of lead, bismuth, tin, indium, cadmium and antimony.

4. A process for the production of fiber reinforced resin structures which comprises, under tension:
   (a) coating a plurality of continuous fibers in spaced relation to each other with a liquid heat curable thermosetting resin composition at a resin temperature below the temperature at which cure of the thermosetting resin is initiated;
   (b) converging the coated fibers to a common point to achieve contiguous contact of fibers while removing excess of the liquid heat curable thermosetting resin from the fibers;
   (c) spreading the resin coated fibers from the common point to achieve spaced relation between the resin coated fibers;
   (d) passing the resin coated fibers in spaced relation to each other through at least one elongated radiant preheating zone having at least one heated internal surface, the internal surfaces of the preheating zone being in spaced relation to the spaced resin coated fibers, said preheating zone raising the applied resin by radiation and convection to a temperature sufficient to reduce the viscosity of the resin relative to the introduction viscosity of the resin to the radiant preheating zone and initiate cure of the resin;
   (e) converging and passing the heated resin coated fibers through a structure shaping orifice of at least one first cold shaping die position between said radiant preheating zone and a next radiant heating zone, said cold shaping die being at a die temperature substantially below the temperature at which curing of the resin is initiated;
   (f) passing the resin coated fibers from the first cold shaping die through a plurality of elongated radiant heating zones, each having at least one heated internal surface, each heating zone being spaced from each other and from at least one interposed cold shaping die which is relatively narrow with respect to the length of a radiant heat zone and having a structure shaping orifice, the internal surfaces of each heating zone being in spaced relation to the resin coated fibers, said radiant heating zones raising the applied resin by radiation and convection to a temperature above the temperature of the radiant preheating zone and sufficient to reduce the viscosity of the resin relative to the introduction viscosity of the resin to a radiant heating zone and initiate further cure of the resin;
   (g) drawing the fibers and resin through the orifices of each cold shaping die between each radiant heating zone at a die temperature substantially below the temperature at which curing of the resin is initiated;

(h) drawing the resin coated fibers through at least one final cold shaping die following the last of said radiant heating zones, said die being at a temperature substantially below the temperature at which cure of the resin is initiated, the resin being at the gel point at or prior to contact with said final die;

(i) passing the resin coated fibers from the final die through at least one curing zone providing internal heating surfaces in spaced relation from the resin coated fibers for a time sufficient for the resin to achieve a hard gelled surface;

(j) passing, in the substantial absense of oxygen, the resin coated fibers having the hard gelled surface through at least one molten metal bath maintained at a temperature from about 95° C. to the anaerobic degradation temperature of the resin for a time sufficient to achieve essentially complete cure of the resin of fiber reinforced resin structure.

5. A process as claimed in claim 4 in which the molten metal bath is maintained at a temperature from about 130° C. to 230° C.

6. A process as claimed in claim 4 in which the molten metal bath comprises at least two metals selected from the group consisting of lead, bismuth, tin, indium, cadmium and antimony.

* * * * *